(No Model.) 7 Sheets—Sheet 4.

A. B. ANDERSON.
APPARATUS FOR TRANSPORTING SHIPS BY RAILWAY.

No. 593,153. Patented Nov. 2, 1897.

WITNESSES:

INVENTOR
Axel B. Anderson
BY
A. P. Thayer
ATTORNEY (No Model.) 7 Sheets—Sheet 6.
A. B. ANDERSON.
APPARATUS FOR TRANSPORTING SHIPS BY RAILWAY.

No. 593,153. Patented Nov. 2, 1897.

WITNESSES: INVENTOR

BY

ATTORNEY (No Model.) 7 Sheets—Sheet 7.
A. B. ANDERSON.
APPARATUS FOR TRANSPORTING SHIPS BY RAILWAY.
No. 593,153. Patented Nov. 2, 1897.
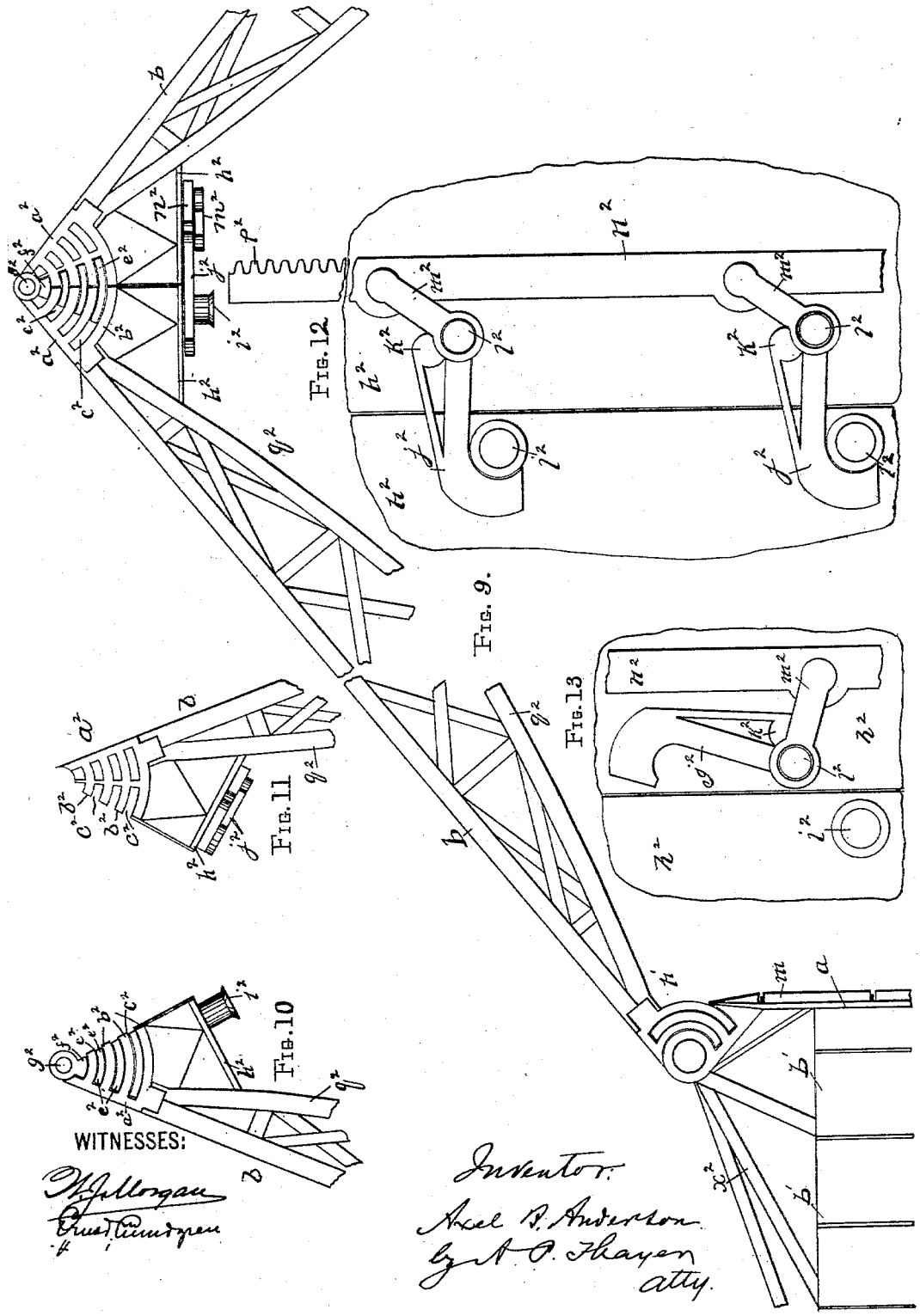

UNITED STATES PATENT OFFICE.

AXEL BERNHARD ANDERSON, OF BROOKLYN, NEW YORK.

APPARATUS FOR TRANSPORTING SHIPS BY RAILWAY.

SPECIFICATION forming part of Letters Patent No. 593,153, dated November 2, 1897.

Application filed July 11, 1896. Serial No. 598,792. (No model.)

*To all whom it may concern:*

Be it known that I, AXEL BERNHARD ANDERSON, a subject of the King of Sweden and Norway, and a resident of Brooklyn, in the county of Kings and State of New York, have invented certain new and useful Improvements in Apparatus for Transporting Ships by Railway, of which the following is a specification.

My invention consists of improvements in the construction of apparatus for transporting ships by railway, as hereinafter described, reference being made to the accompanying drawings, in which—

Figure 1:
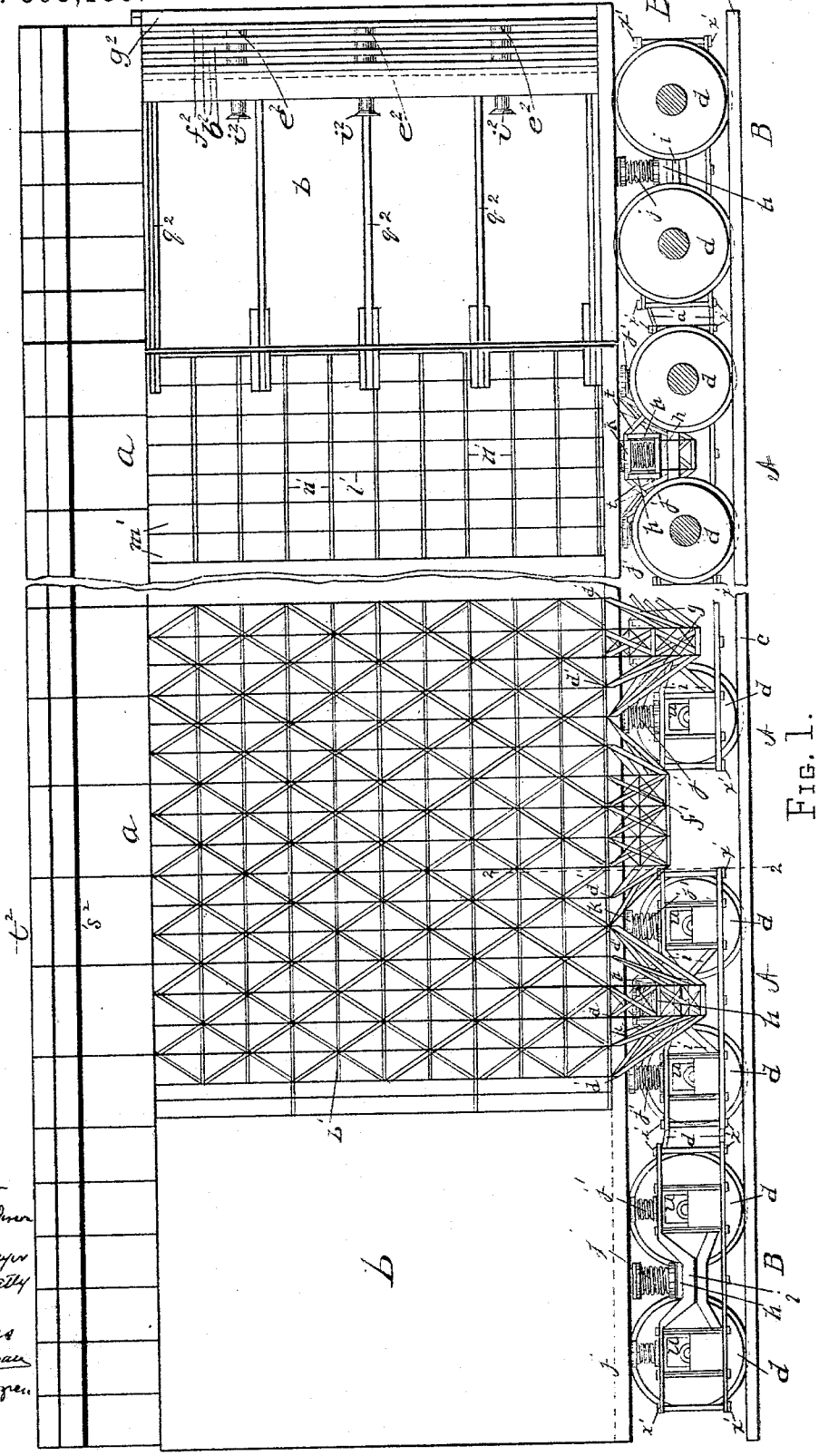
Figure 2:
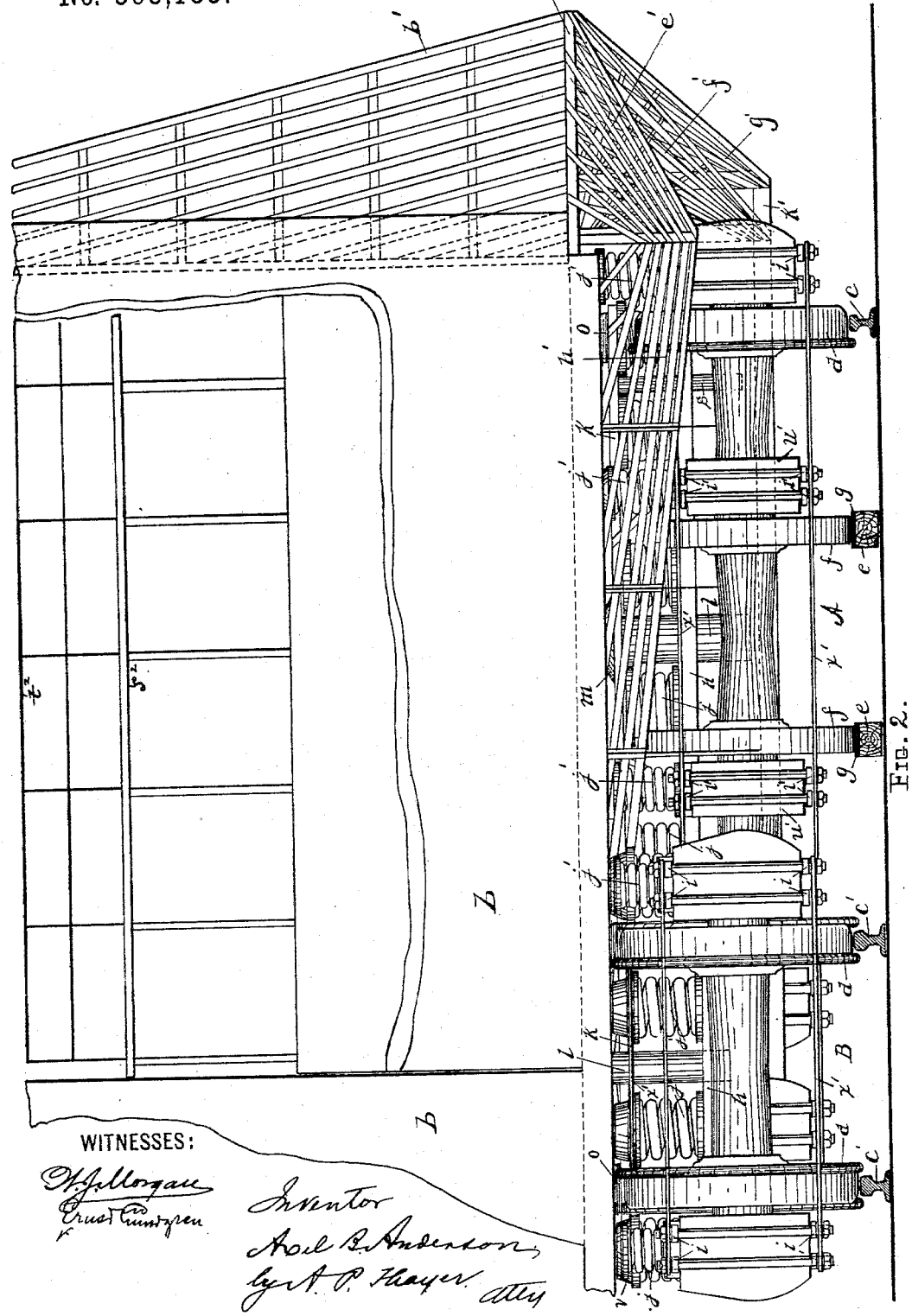
Figure 3:
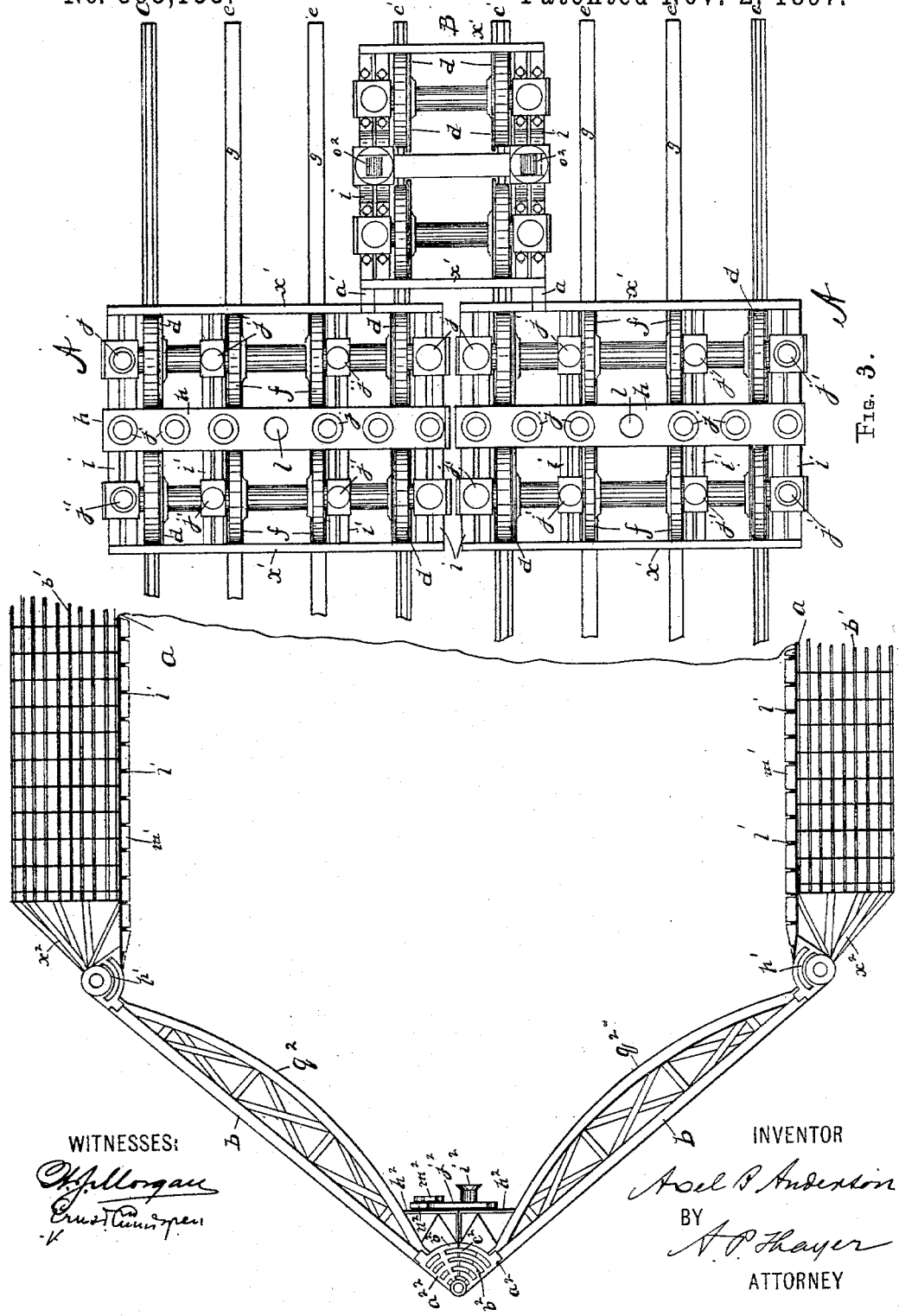
Figure 4:
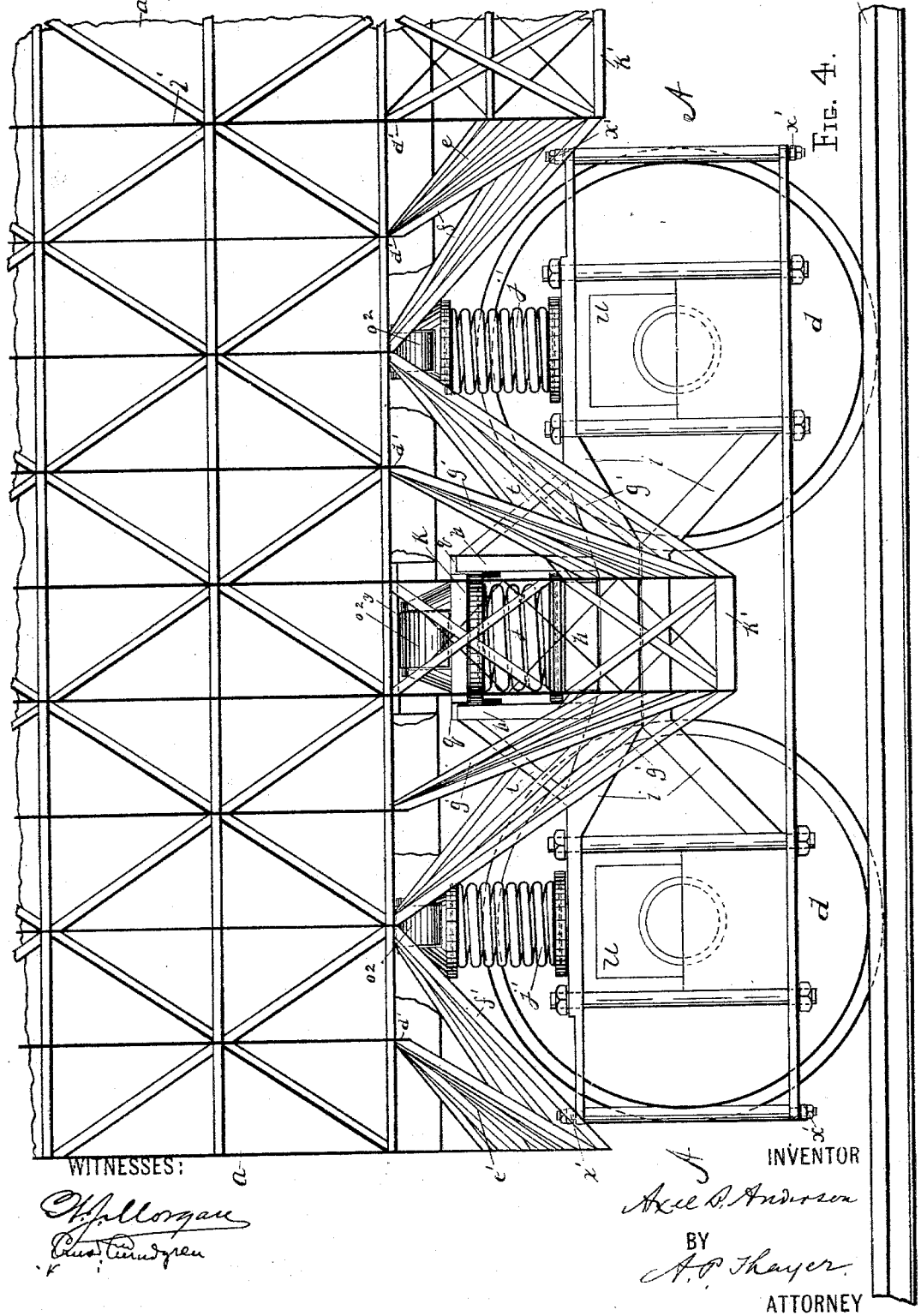
Figure 5:
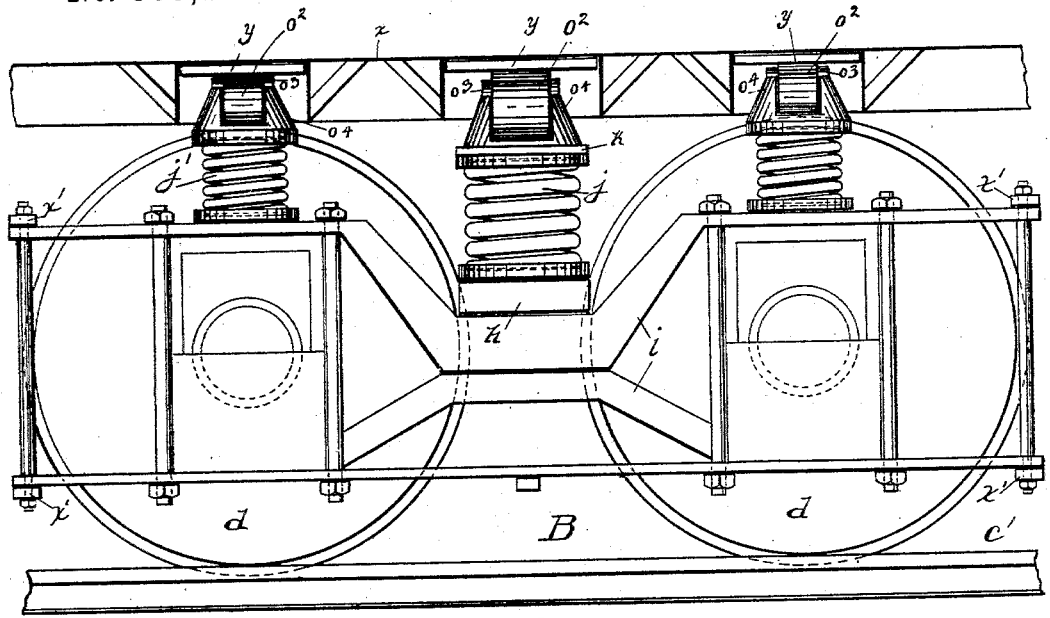
Figure 6:
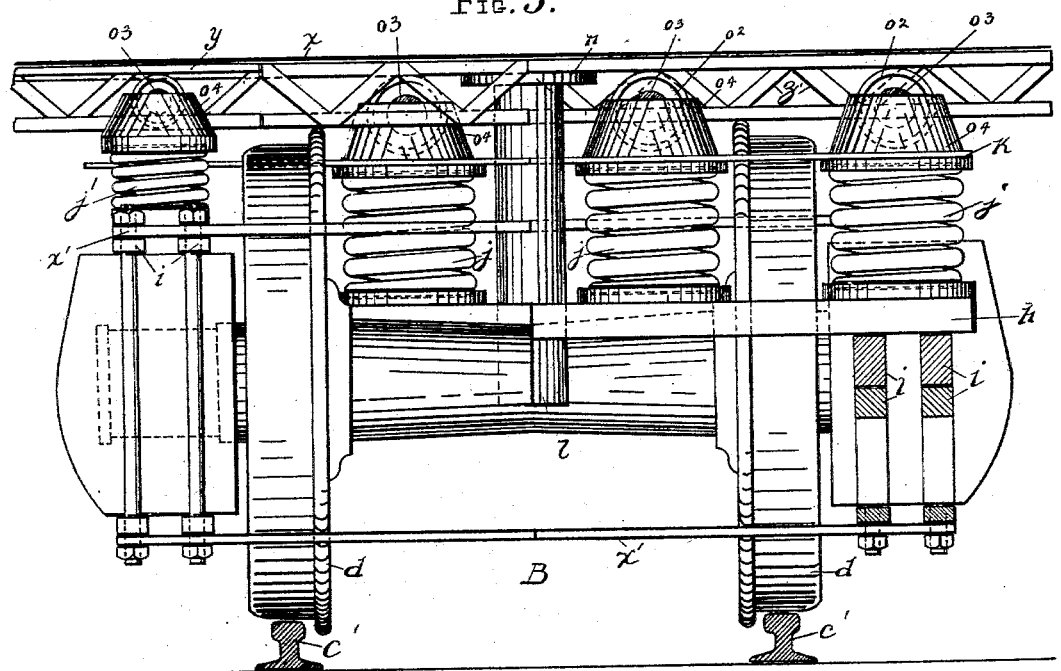
Figure 7:
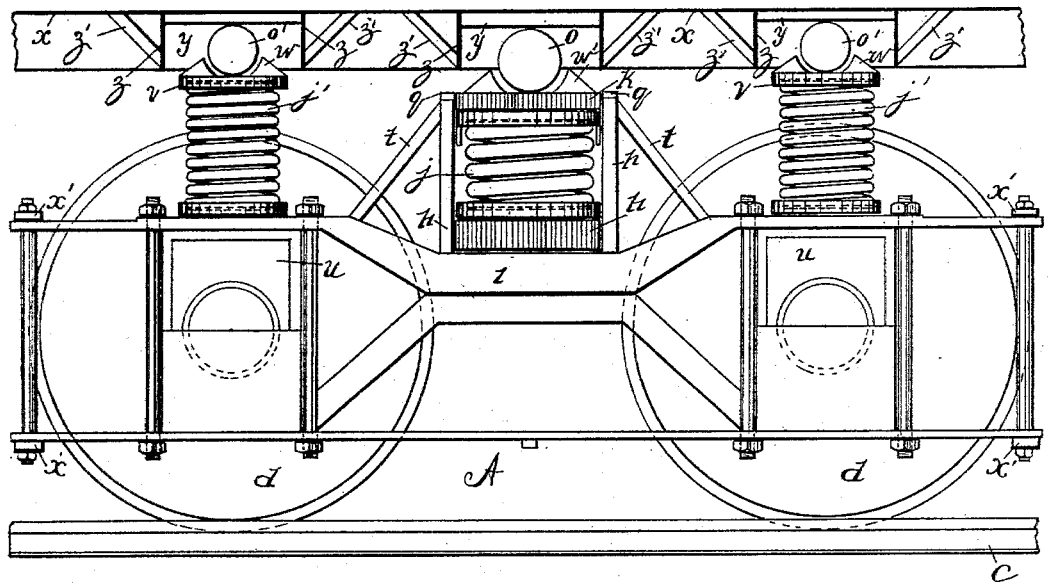

Figure 1 represents portions of the two extremities of a tank-car constructed according to my invention for transporting ships afloat in it, the right-hand portion being in sectional elevation and the left-hand portion in side elevation. Fig. 2 is a view of part of the same in end elevation with the part of the right-hand truck in advance of line 2 2, Fig. 1, omitted, the rails of the track being in transverse section. Fig. 3 represents a plan of one end portion of the complete tank-car and a truck plan of the other end portion, part of the tank being detached. It also shows the rail plan of the track. Fig. 4 is a side elevation of a section of the tank-car on an enlarged scale for greater clearness. Fig. 5 is a side elevation, and Fig. 6 a front elevation, of the truck employed at the extremities of the tank and sections of the bottom of the tank. In Fig. 6 a portion of the truck is cut away at the right-hand side, so that it is viewed in two planes. Fig. 7 is a side elevation, and Fig. 8 a front elevation, in part, of one of the series of trucks employed under the main body of the tank and sections of the bottom of the tank. Fig. 9 is a plan of the gates of one end of the tank on a larger scale, the gates being closed and locked together. Figs. 10 and 11 are details of the gates in plan view as they appear when parted for the opening of the tank for floating the ship in or out. Fig. 12 is a detail of the closed gates in inside elevation, showing them locked. Fig. 13 is a like view showing the locking apparatus disconnected.

A tank, as $a$, of sufficient dimensions to hold a ship and a quantity of water for floating the ship therein is to be mounted on trucks running on rails extending into the water to a sufficient depth for floating the ships in and out, said tank being provided at each end with gates $b$ to open and close the ends, as required. In carrying out this general plan a rail-track of substantial construction and comprising a sufficient number of parallel rails, according to the demands of the largest ships to be handled, is provided, some of which rails, as $c\ c'$, will be of ordinary T-rail form, on which the ordinary flanged truck-wheels $d$ are to run, and others, as $e$, will be adapted for plain-faced bearing-wheels, as $f$, and may be of wood or stone faced with metal $g$. In this example of my invention I represent two outside T-rails $c$, two middle T-rails $c'$, and four plain bearing-rails $e$, these being distributed equally between the outside and middle T-rails, respectively, the gage of said outside and middle T-rails being very broad, while the gage of rails $c'\ c'$ is much less.

For supporting the main body of the tank I employ two series of trucks of like broad gage as the rails $c\ c'$, and having intermediate bearing-wheels $f$, working on rails $g$, the trucks of the said series being located side by side, as best seen in Fig. 3, and for the extremities of the tank, which are pointed, I employ a single truck for each, said trucks being of the gage of rails $c'$ and running on them, as also seen best in Fig. 3, but the two forms of trucks and their relative arrangements are also shown in Figs. 1 and 2.

The wide trucks for supporting the main body of the tank are designated generally by reference letter A. The others are marked B. These trucks are in their general construction substantially like ordinary car-trucks, but have besides the intermediate bearing-wheels of truck A, already described, some special features of adaptation to their use in my invention, which will be pointed out and claimed.

Figure 8:
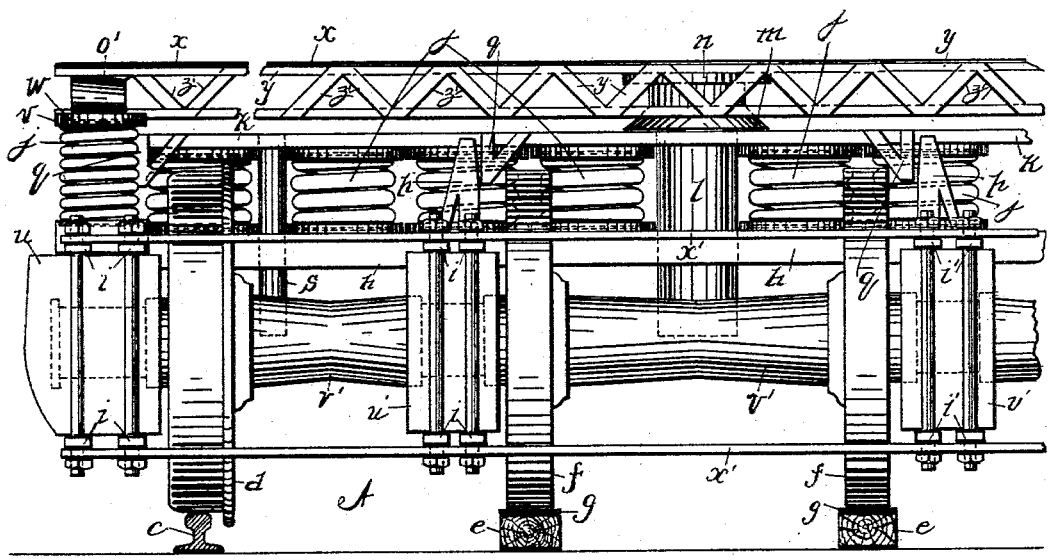

The truck A is represented in side and front views detached from the tank and on a large scale in Figs. 7 and 8. A strong bolster-plate $h$ is seated at its ends upon the side frames $i$ at their middle and on intermediate frames $i'$, said plate extending from one to the other of said side frames and carrying coiled springs $j$ at intervals along it, on which is carried another like plate $k$, but of lesser thickness. At the middle of these plates a king-bolt $l$ is fitted, said bolt having a collar $m$, resting on the upper plate $k$, and a head $n$, on which a portion of the weight of the tank rests, while other portions of the weight of the tank rest on rollers $o$, provided at the extremities of the plate. Each side of plate $k$ are standards $p$, supported on the edges of plate $h$, between which plate $k$ is controlled against thrusts tending to shift and cause it to rock laterally, and said plate is also provided with pendent brackets $q$, which work between standards $p$, so as to control said plate against shifting lengthwise through the effect of shocks tending in that direction. Near the extremities of these plates are strong steady-pins $s$, fixed to plate $k$ and working in guide-holes of plate $h$ as a further means of steadying the plate $k$ on the springs $j$.

The standards $p$ are stayed on the side frames $i$ by braces $t$. Other supporting-springs $j'$ are mounted on the axle-boxes $u$, on the tops of which are other rollers $o'$, these being mounted in suitable seats $w$ in the caps $v$ of the springs $j'$, affording requisite space for the play of the rolls in use and at the same time keeping them in position. Rollers $o$ rest in similar seats $w$ on plate $k$. The rollers are slightly tapered and range in radial lines of the axis of the king-bolt to accommodate the slight turning motions of the truck on the king-bolt. The bottom plate $x$ of the tank rests on bolsters $y$, which are carried on these rollers, and the bolsters are strengthened by trusses $z$, said trusses being stayed by the lateral braces $z'$. These trussed bolsters extend the entire width of the tank and over the trucks of each line, and those bolsters arranged over the centers of the trucks also rest on the king-bolts $l$.

Intermediate axle-boxes $u'$ are mounted on the axles $v'$ of these wide trucks, which carry intermediate side frames $i'$ for intermediate support of the main bolster $h$. The side frames $i$ and intermediate frames $i'$ are coupled transversely at their extremities by the usual cross-stays $x'$.

The truck B is represented in side and front views detached from the tank and on a large scale in Figs. 5 and 6. Its gage is that of rails $c'$. It differs from truck A only in the width of its gage and in the arrangement of its carrying rollers $e^2$, for being employed in a central position under the taper end of the tank, where the weight is less and where in case of the track being curved the demand for the accommodation of lateral movement of the truck relatively to the tank may require the rollers to work laterally instead of lengthwise of the tank, as in the case of the main trucks, said rolls are therefore so arranged in this truck, and they are mounted on pivots $o^3$ in boxes $o^4$, but may of course be arranged to roll on a plane surface, as the others are, if desired. In case there should be curves of such short radius as to demand the arrangement of laterally-moving carrying-rolls on one or more of the main trucks they will be so provided, as in Fig. 4.

The end trucks B will be coupled to the first of the series of main trucks in any approved way, as by links $a'$, connecting the side frames $i$ of truck B with cross-bars $x'$ of trucks A. (See Figs. 1 and 3.) The main trucks A may also be coupled together in any approved way, as desired.

The tank is constructed of boiler-plate with any approved system of bracing for the outsides, as $b'$, having support on cantalivers $d'$, with systems of counter-bracing, as $e'$, $f'$, and $g'$, the braces $e'$ having their support against the bottom of the car by braces $h'$, and braces $f'$ and $g'$ being supported against thrust-bars $k'$, suspended under the trucks and extending from side to side to balance the thrusts of one side by those of the other side. The sides of the tank are stayed inside by the vertical metallic ribs $l'$ and other horizontal ribs $n'$, and are lined with wood facing $m'$ to protect the sides of the ships from the metal ribs.

The gate-hinges have intermeshing ribs and grooves $p'$ on the insides of the plates or leaves designed to make close joints to prevent leaks at the hinges. The gate-hinges are stayed by braces $x^2$, supported by the side bracing $b'$.

The meeting edges of the gates consist of metallic plates $a^2$, having on the insides coincident curved ribs $b^2$, which when the gates are closed meet in abutting contact in the central vertical plane of the tank. Between these ribs are corresponding curved channels $c^2$, in which the flanges $e^2$ of a key-bit $f^2$, pivoted at $g^2$ in one of the plates $a^2$, engage when the key is set in the position represented in Fig. 9 to pack the joint when the gates are closed. The gates are trussed inside, as at $q^2$, for sustaining the water-pressure.

For locking the gates together there is a vertical plate $h^2$ attached to each inside of the meeting edges suitably for their edges to meet when the gates are closed, on one of which plates there are studs $i^2$, projecting inward from the side, and on the other plate are hooks $j^2$, pivoted to it at $k^2$ and connected by a pivot-stud $l^2$ and a link $m^2$ with a vertical bar $n^2$, which extends upward and has a toothed rack $p^2$, by which it may be engaged with a pinion for the application of power for raising and lowering the locking-bar. The pivot-studs $l^2$, being eccentric to the pivots $k^2$, cause the hooks to draw the gates together tightly when hooked on the studs $i^2$. A suitable foot-way, as $s^2$, and hand-rail $t^2$ will be provided at the top of the tank, as indicated in Figs. 1 and 2.

I claim as my invention—

1. In apparatus for transporting ships afloat in a tank, the combination with the tank, of a system of trucks comprising two lines of main trucks placed side by side on parallel tracks, and end trucks placed centrally under the tank, and on the inner rails of the main-truck tracks, substantially as described.

2. In apparatus for transporting ships afloat in a tank, the combination with the tank, of a system of trucks comprising two lines of main trucks placed side by side on parallel tracks, consisting of outside rails for flanged wheels and intermediate bearing-rails, said trucks having outside flanged wheels, and intermediate bearing-wheels on each and all the axles substantially as described.

3. In apparatus for transporting ships afloat in a tank, the combination with the tank, of a system of trucks comprising two lines of main trucks placed side by side on parallel tracks consisting of outside rails for flanged wheels and intermediate bearing-rails, said trucks having outside flanged wheels and intermediate bearing-wheels, and end trucks placed centrally under the tank and on the inner rails for the main trucks substantially as described.

4. In apparatus for transporting ships afloat in a tank, the combination with the tank, of a system of trucks comprising two lines of main trucks placed side by side on parallel tracks consisting of outside rails for flanged wheels and intermediate bearing-rails, said trucks having outside flanged wheels and intermediate bearing-wheels, and also having intermediate side frames, and axle-boxes supporting said intermediate frames substantially as described.

5. In apparatus for transporting ships afloat in a tank, the combination with the tank, of a system of trucks comprising two lines of main trucks placed side by side on parallel tracks, a bearing-plate supported on the middle of the truck-frames transversely, a series of supporting-springs placed side by side along said bearing-plate, a plate carried on the springs, a king-bolt located at the middle of said plates and trussed tank-supporting bolsters extending the entire width of the tank and resting on said rollers of both lines of tracks, the trussed bolsters over the middle of the trucks also resting on the king-bolts substantially as described.

6. In apparatus for transporting ships afloat in a tank, the combination with the tank, of a system of trucks comprising two lines of main trucks placed side by side on parallel tracks, a bearing-plate supported on the middle of the truck-frames transversely, a series of supporting-springs placed side by side along said bearing-plate, a plate carried on the springs, a king-bolt located at the middle of the plates, bearing-rollers at the extremities of the upper plate whereon, and on the king-bolt the tank is carried, the series of guide-standards of the bearing-plate, embracing the edges of the upper plate and the series of guide-brackets of the upper plate intermediate of the standards of the bearing-plate controlling said upper plate against lengthwise and lateral play substantially as described.

7. In apparatus for transporting ships afloat in a tank, the combination with the tank, of a system of trucks comprising two lines of main trucks placed side by side on parallel tracks, a bearing-plate supported on the middle of the truck-frames transversely, a series of supporting-springs placed side by side along said bearing-plate, a plate carried on the springs, a king-bolt located at the middle of the plates, bearing-rollers at the extremities of the upper plate, springs located on the axle-boxes, and rollers carried on the said springs whereon and on the rollers and king-bolt carried by the bearing-plates, the tank is carried substantially as described.

8. In apparatus for transporting ships afloat in a tank, the combination with the tank, of trucks for carrying the tank, a system of braces for the outsides of the tank, cantaliver-supports for said braces, and counter-braces for the cantalivers having support against the bottom of the tank, and against thrust-bars suspended under the truck-frames between the wheels, and others suspended behind the trucks substantially as described.

9. The combination with the gate-hinges, of the intermeshing ribs and grooves for packing the hinge-joints substantially as described.

10. The combination with the gates, of the meeting-edge plates having coincident grooves and intermediate abutting ribs, of the key pivoted in one of said plates and having flanges intermeshing with the grooves of the two plates when the gates are closed substantially as described.

11. The combination with the gates, of the locking-plates, the studs on one of said plates, and the hooks and the lock-actuating bar on the other plate, said hooks having the eccentric connection with the actuating-bar substantially as described.

Signed at New York city, in the county and State of New York, this 23d day of June, A. D. 1896.

AXEL BERNHARD ANDERSON.

Witnesses:
W. J. MORGAN,
A. P. THAYER.